(12) United States Patent
Horiuchi et al.

(10) Patent No.: US 8,866,738 B2
(45) Date of Patent: Oct. 21, 2014

(54) INFORMATION PROCESSING APPARATUS, METHOD OF CONTROLLING DISPLAY AND STORAGE MEDIUM

(75) Inventors: Kensuke Horiuchi, Kunitachi (JP); Makito Ogura, Hino (JP); Kentaro Nagahama, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 167 days.

(21) Appl. No.: 13/537,644

(22) Filed: Jun. 29, 2012

(65) Prior Publication Data

US 2013/0141350 A1 Jun. 6, 2013

(30) Foreign Application Priority Data

Dec. 2, 2011 (JP) .................................. 2011-264598

(51) Int. Cl.
*G09G 5/00* (2006.01)

(52) U.S. Cl.
USPC .......................................................... 345/156

(58) Field of Classification Search
USPC ................................................. 345/156, 173
See application file for complete search history.

(56) References Cited

U.S. PATENT DOCUMENTS

| | | | |
|---|---|---|---|
| 7,716,224 B2 | 5/2010 | Reztlaff, II et al. | |
| 7,853,900 B2 | 12/2010 | Nguyen et al. | |
| 7,921,309 B1 | 4/2011 | Isbister et al. | |
| 8,108,793 B2 | 1/2012 | Nguyen et al. | |
| 8,234,282 B2 | 7/2012 | Reztlaff, II et al. | |
| 8,266,173 B1 | 9/2012 | Reztlaff, II et al. | |
| 8,341,210 B1 | 12/2012 | Lattyak et al. | |
| 8,341,513 B1 | 12/2012 | Lattyak et al. | |
| 2008/0243788 A1 | 10/2008 | Reztlaff et al. | |
| 2008/0293450 A1 | 11/2008 | Ryan et al. | |
| 2009/0327948 A1* | 12/2009 | Penttinen et al. | 715/780 |
| 2011/0205178 A1 | 8/2011 | Yoshida et al. | |
| 2012/0077554 A1* | 3/2012 | Ahn et al. | 455/574 |
| 2012/0105460 A1* | 5/2012 | Kim | 345/501 |
| 2012/0240075 A1* | 9/2012 | Kim et al. | 715/776 |

FOREIGN PATENT DOCUMENTS

| | | |
|---|---|---|
| JP | H3-154167 A2 | 7/1991 |
| JP | 9-265470 A | 10/1997 |
| JP | 2003-150597 A | 5/2003 |
| JP | 2004-265434 A | 9/2004 |
| JP | 2005-189906 A | 7/2005 |
| JP | 2005-275547 A | 10/2005 |
| JP | 2008-33945 A | 2/2008 |

(Continued)

OTHER PUBLICATIONS

Office Action dated Aug. 28, 2012 of corresponding Japanese Patent Application 2011-264598—9 pages.

(Continued)

*Primary Examiner* — Robin Mishler
(74) *Attorney, Agent, or Firm* — Knobbe Martens Olson & Bear LLP

(57) ABSTRACT

According to one embodiment, an information processing apparatus includes a browsing log recorder, a first display module, a second display module, an operation input module and a controller. The browsing log recorder is configured to record a browsing log of e-books. The controller is configured to cause the first display module to display the interrupted page of the most recently interrupted e-book or to cause the second display module to display the list of interrupted e-books in accordance with an operation of the operation input module.

15 Claims, 5 Drawing Sheets

(56) References Cited

FOREIGN PATENT DOCUMENTS

| JP | 2010-529527 A | 8/2010 |
| JP | 2010-211393 A | 9/2010 |
| JP | 2010-224927 A | 10/2010 |
| JP | 2011-076401 A | 4/2011 |
| JP | 2011-186624 A | 9/2011 |

OTHER PUBLICATIONS

Office Action dated Dec. 4, 2012 of corresponding Japanese Patent Application 2011-264598—14 pages.

Office Action dated Mar. 18, 2014 of corresponding Japanese Patent Application 2013-090636—8 pages.

UT-PB1 Detailed Operation Guidebook, 2011, [online], http://panasonic.jp/support/npa.

E-book Tablet UT PB1 / PanaSense / CLUB Panasonic [searched date: Mar. 5, 2014], [online], http://ec-club.panasonic.jp/mall/sense/open/product/UT-PB1/?top=1.

[PC watch] Trial Report of "UT-PB1," Panasonic's 7-type color tablet—Android-exclusive Terminal in Cooperation with Rakuten's Raboo, [online], http://pc.watch.impress.co.jp/docs/topic/feature/20110826_472739.html.

* cited by examiner

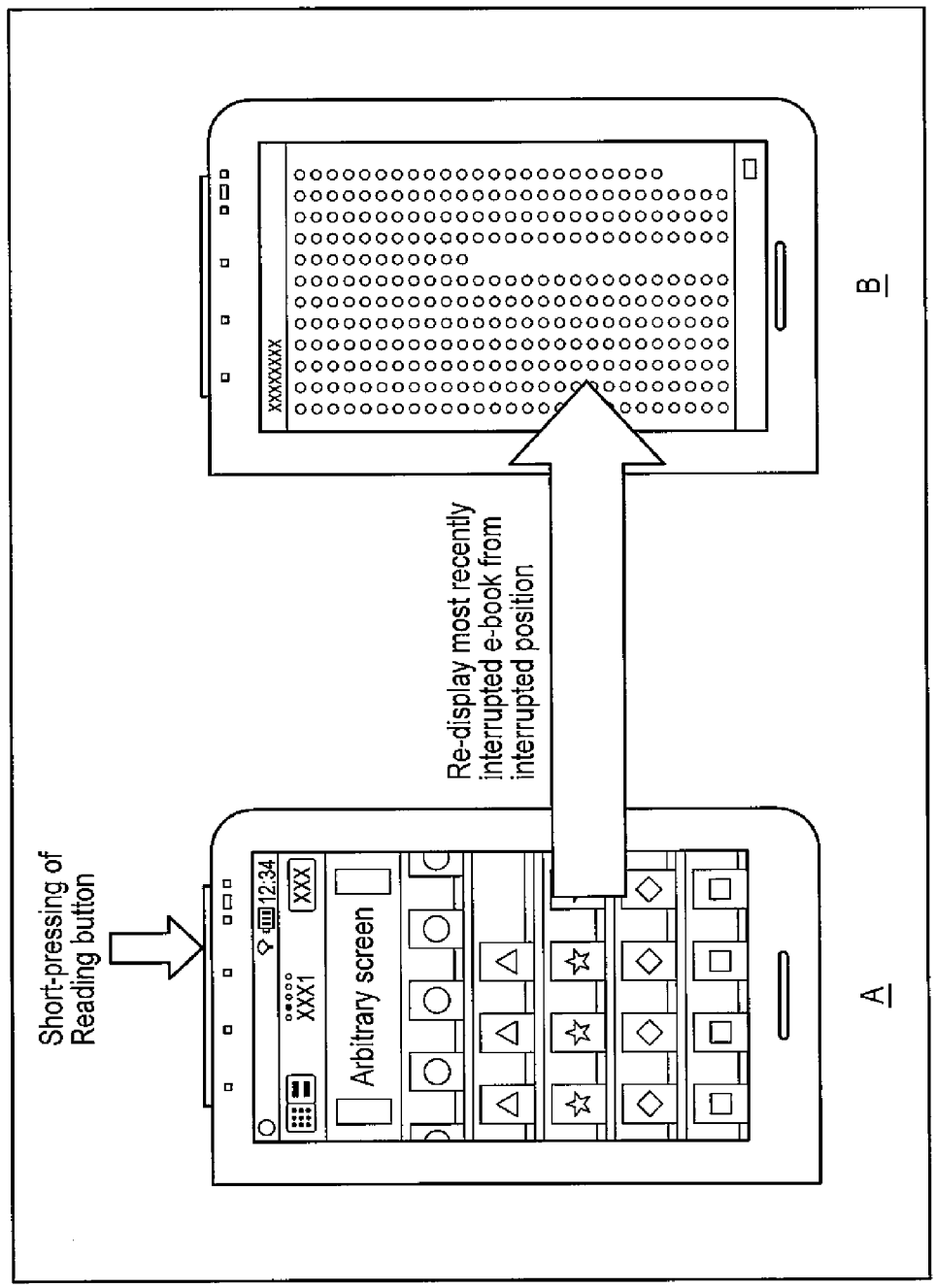
F I G. 3

INFORMATION PROCESSING APPARATUS, METHOD OF CONTROLLING DISPLAY AND STORAGE MEDIUM

CROSS-REFERENCE TO RELATED APPLICATIONS

This application is based upon and claims the benefit of priority from prior Japanese Patent Application No. 2011-264598, filed Dec. 2, 2011, the entire contents of which are incorporated herein by reference.

FIELD

Embodiments described herein relate generally to an information processing apparatus, a method of controlling display and storage medium.

BACKGROUND

In recent years, an information processing apparatus, which can be driven by a battery and which is configured to be easily carried, for allowing the user to download (purchase) and browse digital book data (to be referred to as e-books hereinafter) via the Internet has begun to prevail.

E-books are normally appended with cover image data, and the information processing apparatus of this type displays a list of purchased e-books using these image data. The user selects a cover image that he or she wants to browse from the cover images displayed in the list on a screen, and begins to browse a target e-book.

It is troublesome for the user to perform a series of operations every time he or she restarts to browse a half-finished book, that is, to display a list of books from an initial screen, to select a target book from the list of books, and to open the last page in the previous browsing operation. Also, a large number of users parallelly read a plurality of books.

Therefore, it is desirable to simply attain an operation for re-displaying an interrupted page of a most recently browsing-interrupted book, and an operation for re-displaying an interrupted page of a target book from a plurality of half-finished books.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary view showing transition of screens on a touch panel display when a Reading button is short-pressed in the information processing apparatus according to the embodiment.

DETAILED DESCRIPTION

Various embodiments will be described hereinafter with reference to the accompanying drawings.

In general, according to one embodiment, an information processing apparatus includes a browsing log recorder, a first display module, a second display module, an operation input module and a controller. The browsing log recorder is configured to record a browsing log of e-books. The first display module is configured to display an interrupted page of a most recently interrupted e-book based on the browsing log. The second display module is configured to display a list of interrupted e-books based on the browsing log. The controller is configured to cause the first display module to display the interrupted page of the most recently interrupted e-book or to cause the second display module to display the list of interrupted e-books in accordance with an operation of the operation input module.

Figure 1:
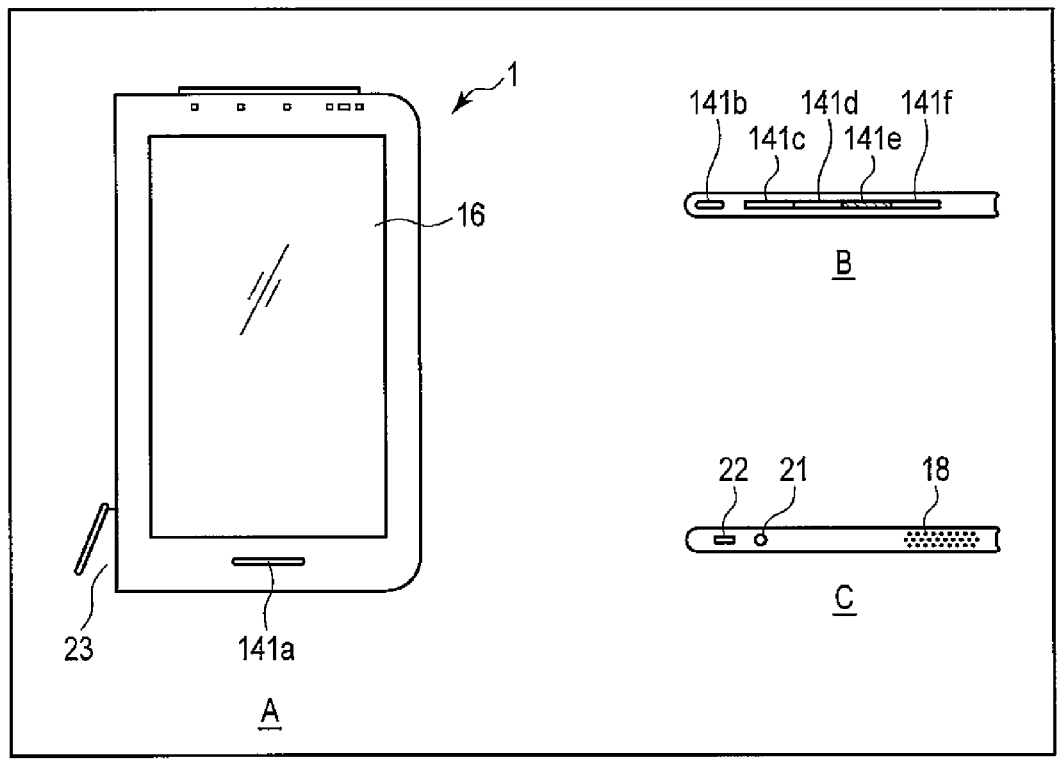
FIG. 1 is an exemplary view showing the outer appearance of an information processing apparatus according to an embodiment.

FIG. 1 is an exemplary view showing the outer appearance of an information processing apparatus 1 according to this embodiment. This information processing apparatus 1 is implemented as a portable terminal which allows the user to download and browse e-books via the Internet. In FIG. 1, "A" is a front view of the information processing apparatus 1, "B" is a top view of the information processing apparatus 1, and "C" is a bottom view of the information processing apparatus 1.

As shown in "A" of FIG. 1, a touch panel display 16 is arranged on a central portion of a front surface of a housing of the information processing apparatus 1. A home button 141a as one of various operation buttons is arranged on a surrounding portion of the touch panel display 16 and on a lower portion of the front surface of the housing. The home button 141a is used to return a display on the touch panel display 16 to an initial screen. Note that a slot 23 used to receive, for example, a MicroSD (Secure Digital) card (registered trademark) is arranged on the side surface of the housing. "A" of FIG. 1 shows a lid used to cover this slot 23. The information processing apparatus 1 includes a wireless communication function using, for example, Wi-Fi. With this wireless communication function, the information processing apparatus 1 allows the user to purchase, that is, to download e-books via the Internet.

As shown in "B" of FIG. 1, various operation buttons 141b to 141f are arranged on the top surface of the housing of the information processing apparatus 1. An operation button denoted by reference numeral 141b is a power button. The user turns on/off a power supply of the information processing apparatus by operating this power button 141b. Also, an operation button denoted by reference numeral 141e is a Reading button. The operation of the information processing apparatus 1 upon operation of this Reading button 141e will be described later.

Furthermore, as shown in "C" of FIG. 1, a microUSB connector 22 used to connect a universal serial bus (USB) cable, a headphone jack 21 used to connect a headphone, and a loudspeaker 18 are arranged on the bottom surface of the housing of the information processing apparatus 1.

Figure 2:
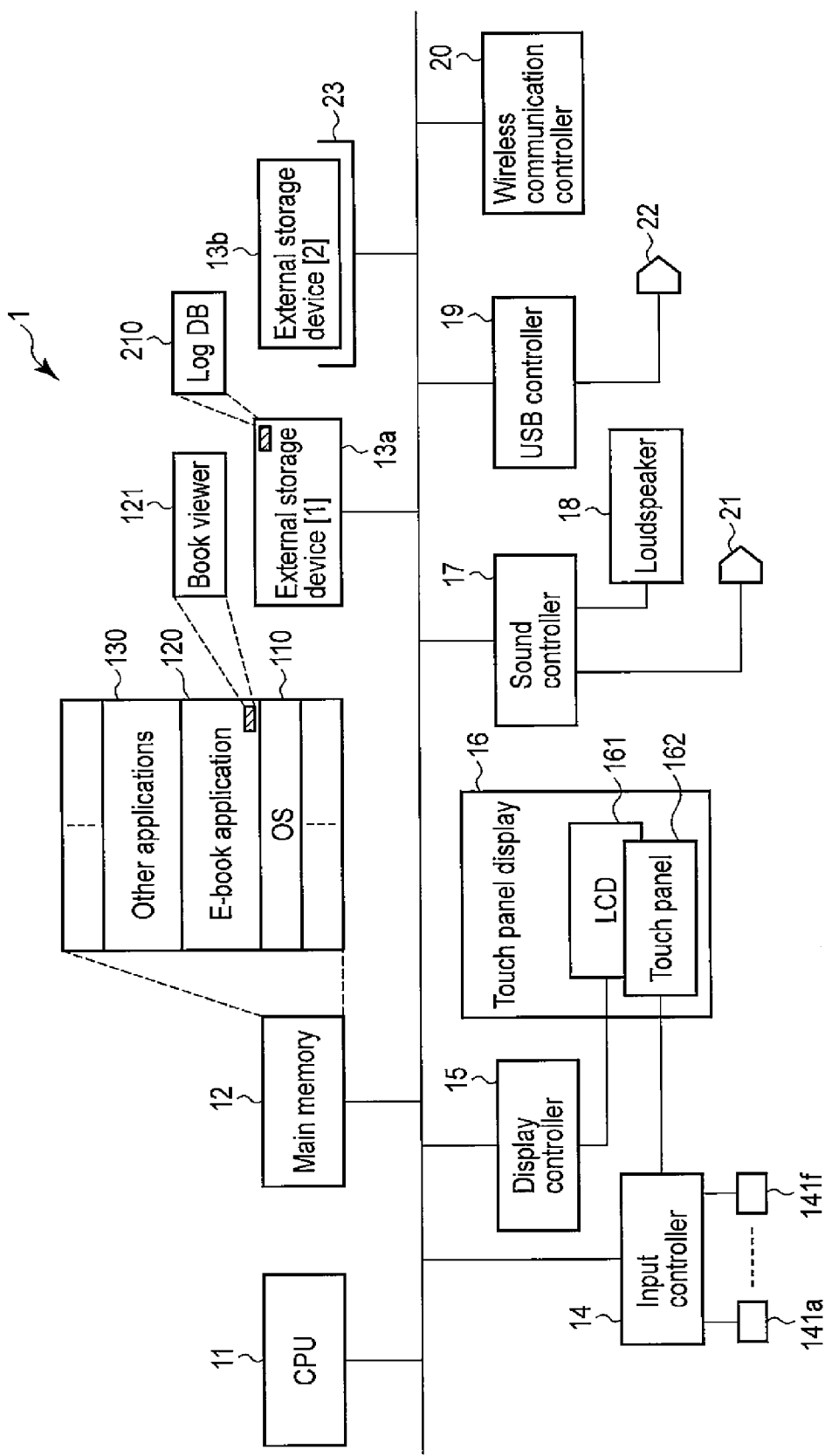
FIG. 2 is an exemplary block diagram showing the system arrangement of the information processing apparatus according to the embodiment.

FIG. 2 is an exemplary block diagram showing the system arrangement of the information processing apparatus 1.

As shown in FIG. 2, the information processing apparatus 1 includes a central processing unit (CPU) 11, main memory 12, external storage device [1] 13a, input controller 14, display controller 15, touch panel display 16, sound controller 17, loudspeaker 18, USB controller 19, wireless communication controller 20, and the like.

The CPU 11 is a processor which controls the operation of the information processing apparatus 1. The CPU 11 loads various programs from the external storage device [1] 13a (for example, a flash memory) onto the main memory 12, and executes the loaded programs. An external storage device [2] 13b in FIG. 2 is a MicroSD card (registered trademark) inserted in the aforementioned slot 23. The external storage device [2] 13b is inserted in the slot 23 mainly for the purpose of extending an area for storing e-books. Also, the CPU 11 can also load programs stored in this external storage device [2] 13b onto the main memory 12, and can execute the loaded programs.

Various programs to be executed by the CPU 11 include an operating system (OS) 110 for resource management, and an e-book application program 120 (to be described below), other application programs 130, and the like, which run on the OS 110. The e-book application program 120 includes a book viewer 121 required to browse e-books. Note that the book viewer 121 is included as one module of the e-book application program 120. However, in another aspect, the book viewer 121 may be installed as a program (one of other application programs 130) independently of the e-book application program 120.

The input controller 14 is a controller required to control data inputs by touch operations on the touch panel display 16 and those by operations of various operation buttons 141a to 141f. On the touch panel display 16, an LCD (Liquid Crystal Display) 161 and touch panel 162 are built in. When the user makes a touch operation on the touch panel display 16, input information including a position on the touch panel 162 is output from the touch panel 162 to the input controller 14. The input controller 14 stores this input information in its own register, and generates an interrupt to notify the CPU 11 of the input information, thereby causing the CPU 11 to read the input information stored in the register. Then, occurrence of an event, that is, the touch operation on the touch panel display 16 is transferred to the OS 110.

Likewise, when the user operates each of various operation buttons 141a to 141f, the input controller 14 stores this input information in its own register, and generates an interrupt to notify the CPU 11 of the input information, thereby causing the CPU 11 to read the input information stored in the register. Thus, occurrence of an event, that is, the operation of each of various operation buttons 141a to 141f is transferred to the OS 110.

The OS 110 notifies the e-book application program 120, other application programs 130, and the like of occurrence of the transferred events.

On the other hand, the display controller 15 is a controller required to control an image display on the LCD 161 built in the touch panel display 16. The display controller 15 includes an accelerator which renders images to be displayed by various programs in place of the CPU 11.

The sound controller 17 is a sound source device. The sound controller 17 generates a sound signal corresponding to audio data to be played back, and outputs the sound signal to the loudspeaker 18. When a headphone is connected to the headphone jack 21, the sound controller 17 switches an output destination of the sound signal to the headphone jack 21.

The USB controller 19 is a module which controls communications with USB devices connected via the microUSB connector 22. The wireless communication controller 20 is a module which controls wireless communications.

The basic principle of display control executed by the e-book application program 120 which runs on the information processing apparatus 1 with the aforementioned arrangement will be described below.

The e-book application program 120 includes a function of allowing the user to purchase e-books, a function of displaying a list of purchased e-books, and a function of allowing the user to browse e-books (a function of controlling the book viewer 121). Also, as shown in FIG. 1, the information processing apparatus 1 includes the Reading button 141e as a hardware button. The user presses (short-presses) this Reading button 141e while an arbitrary screen is displayed on the touch panel display 16, to launch the book viewer 121, to load a most recently reading-interrupted book onto the book viewer 121, and to display a most recently interrupted page position. FIG. 3 is an exemplary view showing transition of screens on the touch panel display 16 when the user short-presses the Reading button 141e. Short-pressing is to press the Reading button 141e for a period less than a threshold.

Figure 5:
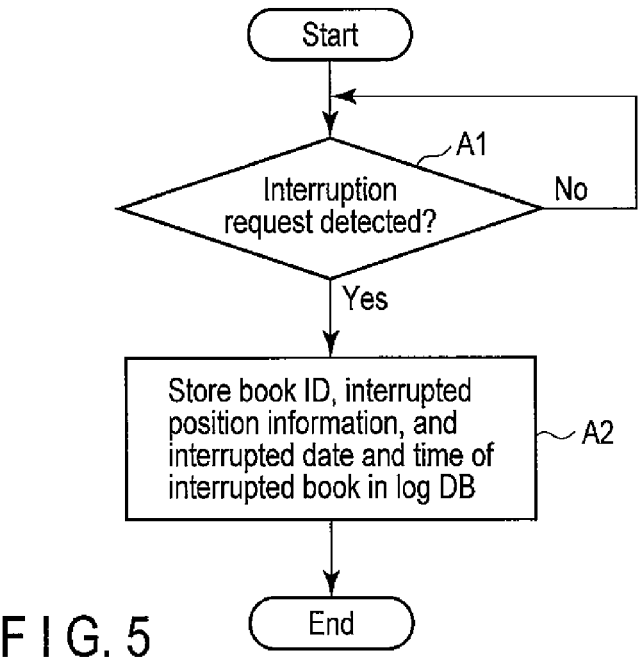
FIG. 5 is an exemplary flowchart showing the sequence of processing when reading is interrupted in the information processing apparatus according to the embodiment.
Figure 4:
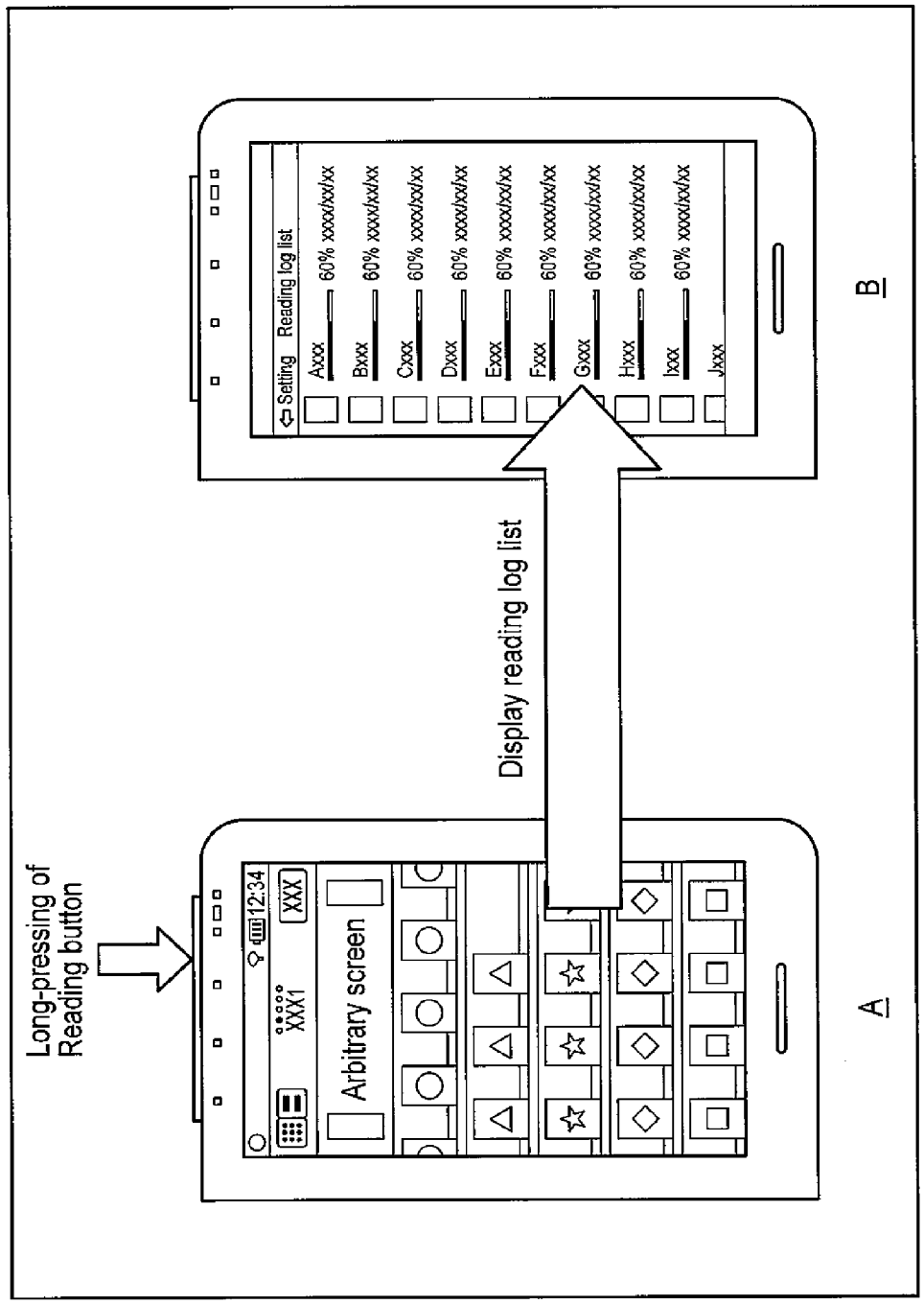
FIG. 4 is an exemplary view showing transition of screens on the touch panel display when the Reading button is long-pressed in the information processing apparatus according to the embodiment.

The user presses (long-presses) this Reading button 141e while an arbitrary screen is displayed on the touch panel display 16, to launch a reading log list. FIG. 4 is an exemplary view showing transition of screens on the touch panel display 16 when the user long-presses the Reading button 141e. Long-pressing is to press the Reading button 141e for a period exceeding the threshold. As shown in FIG. 4, the reading log list displays information of reading-interrupted books in the chronological order of interruptions (for example, in descending order). FIG. 5 is an exemplary flowchart showing the sequence of processing when the user interrupts reading.

When the user interrupts reading, he or she presses a bookmark button (a software button displayed on the touch panel display 16) on the book viewer 121, interruption information can be saved. If the OS 110 notifies the book viewer 121 of occurrence of an event of the touch operation on the bookmark button display position (interruption request event) (YES in block A1), the book viewer 121 registers identification information (book ID), interrupted position (page) information, a browsing start date, and the like of an opened book in a log database 210 (block A2). Also, when a screen transits to that other than the book viewer 121 by an operation of pressing, for example, the home button 141a, reading is interrupted. At this time, the interruption information can be saved.

When the user restarts browsing of a most recently interrupted book, he or she presses (short-presses) the Reading button 141e. The OS 110 notifies the e-book application program 120 of an event of the operation of the Reading button 141e. Upon reception of this event, if that event is a short-pressing event, the e-book application program 120 acquires the book ID of the most recently interrupted book from the log database 210. A short- or long-pressing event of the Reading button 141e may be discriminated by any of the input controller 14, OS 110, and e-book application program 120. When such event is discriminated by the input controller 14 or OS 110, the OS 110 notifies the e-book application program 120 of a short- or long-pressing event of the Reading button 141e. When such event is discriminated by the e-book application program 120, the OS 110 notifies the e-book application program 120 of a pressing event of the Reading button 141e. The e-book application program 120 checks, for example, a duration of this event notification, thereby determining whether the Reading button 141e is short- or long-pressed.

The e-book application program 120 launches the book viewer 121 and passes the book ID of the most recently browsed book, which is acquired from the log database 210, to the book viewer 121. The book viewer 121 opens (loads) a book corresponding to the book ID passed from the e-book application program 120, acquires an interrupted page position, which is registered in the log database 210 in association with that book ID, and displays that page on the screen.

When the user restarts reading from the reading log list, he or she presses (long-presses) the Reading button 141e. Upon occurrence of a long-pressing event of the Reading button 141e, the e-book application program 120 displays the reading log screen, and acquires pieces of information such as book IDs, pieces of interrupted position information, browsing start dates, and the like of books whose reading was interrupted so far (of all books) from the log database 210. Then, the e-book application program 120 displays a list of the pieces of acquired information on the reading log screen in the browsing start date order in turn from, for example, the latest one. Metadata of each e-book describes the total number of pages of that book, and the e-book application program 120 calculates and displays a reading progress ratio based on the total number of pages and the interrupted position information.

When the user selects an arbitrary book from the list, the e-book application program 120 launches the book viewer 121 and passes a book ID of the selected book to the book viewer 121. The book viewer 121 opens (loads) the book corresponding to the book ID passed from the e-book application program 120, acquires an interrupted page position, which is registered in the log database 210 in association with that book ID, and displays that page on the screen.

In this manner, since the Reading button 141e is arranged as a hardware button, the user can restart, without hesitation, browsing of a half-finished book, that is, (1) the lastly interrupted book or (2) one of a plurality of books that the user parallelly reads upon operation of this Reading button 141e. Note that the Reading button 141e may be configured as a software button displayed on the touch panel display 16.

Figure 6:
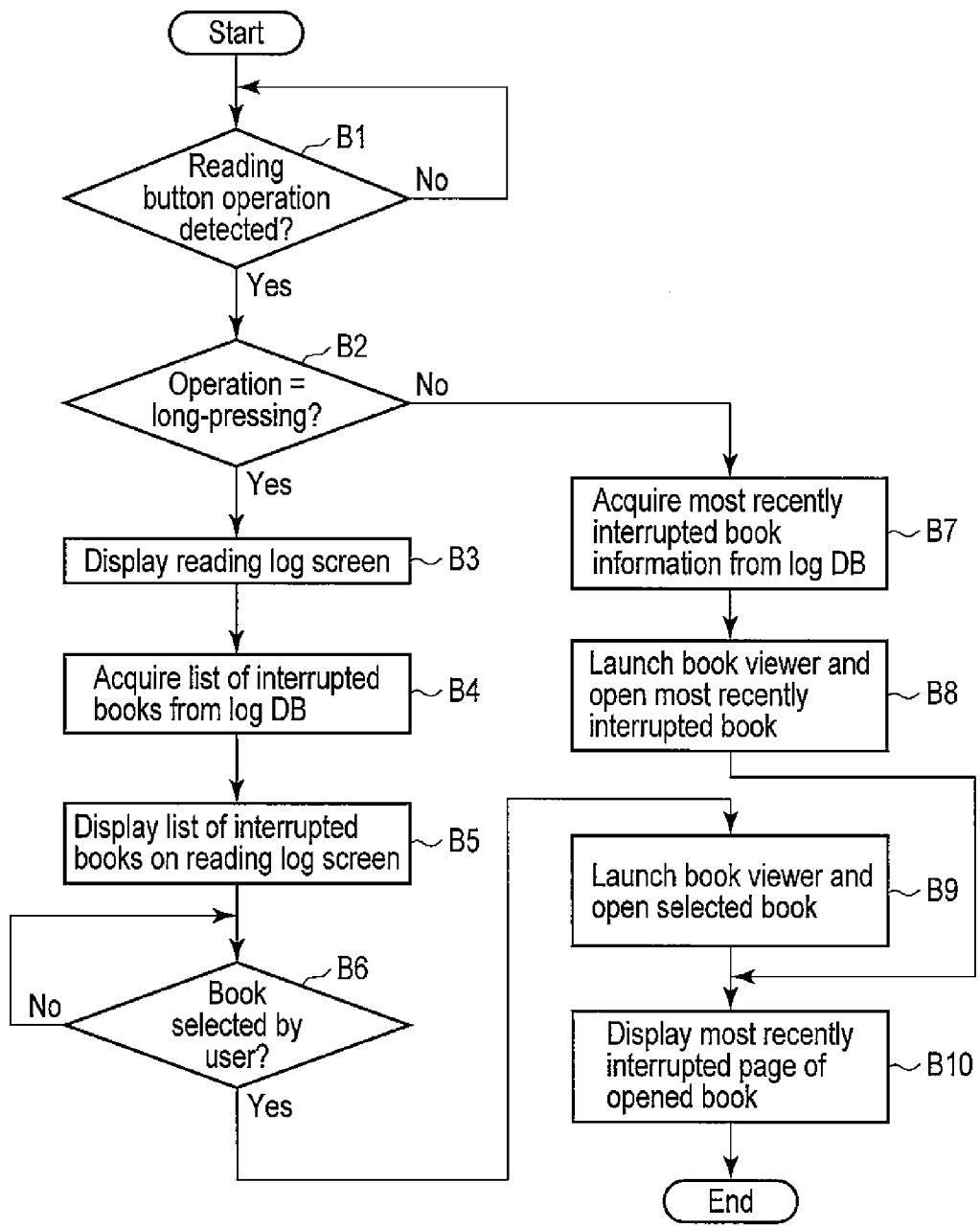
FIG. 6 is an exemplary flowchart showing the sequence of processing when the interrupted browsing of a book is restarted in the information processing apparatus according to the embodiment.

FIG. 6 is an exemplary flowchart showing the sequence of processing when the user restarts browsing of the interrupted book.

Upon operation of the Reading button 141e (YES in block B1), if that operation is a long-pressing operation (YES in block B2), the e-book application program 120 displays the reading log screen (block B3). The e-book application program 120 acquires a list of interrupted books from the log database 210 (block B4), and displays it on the reading log screen (block B5).

If the user selects one book from the list on the reading log screen (YES in block B6), the e-book application program 120 launches the book viewer 121, and passes the book ID of the selected book to the book viewer 121, thereby opening the book corresponding to the book ID (block B9). The book viewer 121 acquires an interrupted page position registered in the log database 210 in association with that book ID, and displays that page on the screen (block B10).

If the operation of the Reading button 141e is a short-pressing operation (NO in block B2), the e-book application program 120 acquires most recently interrupted book information from the log database 210 (block B7). The e-book application program 120 launches the book viewer 121, and passes a book ID of the acquired book to the book viewer 121, thereby opening the book corresponding to that book ID (block B8). The book viewer 121 acquires an interrupted page position registered in the log database 210 in association with that book ID, and displays that page on the screen (block B10).

As described above, the information processing apparatus 1 allows the user to restart browsing of a half-finished book by a simple operation.

In the example of the above description, when the user short-presses the Reading button 141e, browsing of the most recently interrupted book is restarted; when he or she long-presses the Reading button 141e, browsing of one of a plurality of parallelly reading books is restarted. However, assignments of the short- and long-pressing operations may be reversed.

Operation control processing of this embodiment can be implemented by software (program). By installing and executing this software in a normal computer via a computer-readable storage medium that stores the software, the same effects as in this embodiment can be easily attained.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
a recorder to record a browsing log of e-books; and
a controller:
to display an interrupted page of a most recently interrupted e-book indicated by the browsing log if a button is operated in a first manner; and
to display a list of information related to reading progress of interrupted e-books if the button is operated in a second manner, which is different from the first manner, the information comprising a reading progress ratio calculated based on an interrupted page indicated by the browsing log and a browsing date and time indicated by the browsing log.

2. The apparatus of claim 1, wherein:
the operation in the first manner comprises operating for a first period less than a threshold; and
the operation in the second manner comprises operating for a second period exceeding the threshold.

3. The apparatus of claim 1, wherein:
the operation in the second manner comprises operating for a first period less than a threshold; and
the operation in the first manner comprises operating for a second period exceeding the threshold.

4. The apparatus of claim 1, wherein the controller displays an image of a page of an e-book based on the browsing log when the e-book is selected from e-books of which the information are displayed in the list, the page of the selected e-book being displayed at a previous browsing interruption timing.

5. The apparatus of claim 4, further comprising a touch panel display,
wherein an operation for selecting an e-book from e-books of which the information are displayed in the list comprises a touch operation on the touch panel display.

6. A method of controlling display for an information processing apparatus, the method comprising:
- recording a browsing log of e-books;
- displaying an interrupted page of a most recently interrupted e-book indicated by the recorded browsing log if a button is operated in a first manner; and
- displaying a list of information related to reading progress of interrupted e-books if the button is operated in a second manner, which is different from the first manner, the information comprising a reading progress ratio calculated based on an interrupted page indicated by the browsing log and a browsing date and time indicated by the browsing log.

7. The method of claim 6, wherein:
- the operation in the first manner comprises operating for a first period less than a threshold; and
- the operation in the second manner comprises operating for a second period exceeding the threshold.

8. The method of claim 6, wherein:
- the operation in the second manner comprises operating for a first period less than a threshold; and
- the operation in the first manner comprises operating for a second period exceeding the threshold.

9. A computer-readable, non-transitory storage medium having stored thereon a computer program executable by a computer, the computer program controlling the computer to function as:
- a recorder to record a browsing log of e-books; and
- a controller:
  - to display an interrupted page of a most recently interrupted e-book indicated by the browsing log if a button is operated in a first manner; and
  - to display a list of information related to reading progress of interrupted e-books if the button is operated in a second manner, which is different from the first manner, the information comprising a reading progress ratio calculated based on an interrupted page indicated by the browsing log and a browsing date and time indicated by the browsing log.

10. The medium of claim 9, wherein:
- the operation in the first manner comprises operating for a first period less than a threshold; and
- the operation in the second manner comprises operating for a second period exceeding the threshold.

11. The medium of claim 9, wherein:
- the operation in the second manner comprises operating for a first period less than a threshold; and
- the operation in the first manner comprises operating for a second period exceeding the threshold.

12. The method of claim 6, further comprising displaying an image of a page of an e-book based on the browsing log when the e-book is selected from e-books of which the information are displayed in the list, the page of the selected e-book being displayed at a previous browsing interruption timing.

13. The method of claim 12, wherein an operation for selecting an e-book from e-books of which the information are displayed in the list comprises a touch operation on a touch panel display.

14. The medium of claim 9, wherein the controller displays an image of a page of an e-book based on the browsing log when the e-book is selected from e-books of which the information are displayed in the list, the page of the selected e-book being displayed at a previous browsing interruption timing.

15. The medium of claim 14, wherein an operation for selecting an e-book from e-books of which the information are displayed in the list comprises a touch operation on a touch panel display.

* * * * *